July 20, 1965
T. A. ANDERSSON ET AL 3,195,653
DEVICE FOR CONTROLLING PLOWS, PARTICULARLY
MULTI-FURROW PLOWS
Filed Sept. 3, 1963
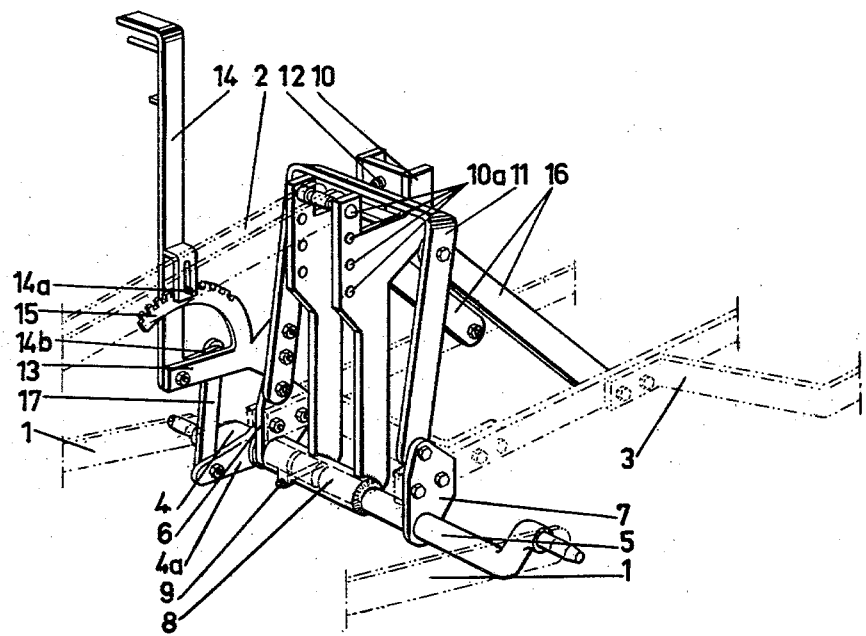
*INVENTORS*
TORSTEN AUGUST ANDERSSON
ERIK HERBERT CARLSSON
BY
*Darby + Darby*
ATTORNEYS 3,195,653
DEVICE FOR CONTROLLING PLOWS, PARTICULARLY MULTI-FURROW PLOWS
Torsten August Andersson and Erik Herbert Carlsson, Overum, Sweden, assignors to Aktiebolaget Överums Bruk, Overum, Sweden, a company of Sweden
Filed Sept. 3, 1963, Ser. No. 306,087
Claims priority, application Sweden, Sept. 4, 1962, 9,568/62
2 Claims. (Cl. 172—449)

This invention relates to a device adapted to control plows, particularly plows for plowing a plurality of furrows, and relates more precisely to plows of such type which are coupled with and drawn by tractors equipped with a three-point hitch which is operated by a hydraulic system.

The coupling of plows to tractors of the said type which can be considered to have constant traction force, is made in known manner by mounting bolts in the two pull rods of the tractor and in the top link placed centrally above the pull rods. During plowing under normal conditions, the resistance by earth to being displaced produces tension in the pull rods and compression in the top link. The hitch under control of the hydraulic system of the tractor adjusts the working depth of the tool with respect to the nature of the soil such, that the total load on the tractor is maintained constant. As a result thereof, in harder soils the furrows will be considerably less deep than in soils of a lighter type.

For single-furrow and two-furrow plows provided with the usual constructional type of coupling between the plow and the pulling and controlling means of the tractor, there is no risk of deviation from the above normal procedures which with respect to the direction of the force in the top link may be considered to cause a compressive force in the same.

The type of coupling mentioned above generally includes a rigid connection between the front yoke and the plow frame and a valve actuated by the top link when that link is under a predetermined degree of compression to raise the plow and decrease the resistance to forward movement.

As indicated, this type of coupling is not adapted to use when heavy gang plow operation is performed. When plowing in lighter soils with this type of equipment the weight of the plows themselves causes the top link to be under tension so that the plows tend to dig deeper into the soil before the resistance increases enough to cause compressive force in the top link resulting in valve actuation. When the valve is actuated the system is readjusted but the adjustment is apt to be too great resulting in a condition of instability. The plow either digs deeper into the soil or is lifted, urging the tractor driver to actuate the control handle of the hydraulic system manually for re-adjusting the correct furrow depth.

Tractors equipped with automatic hydraulic tool control adapted to adjust the working depth of the plow irrespective of compressive or tensile forces in the top link are, it is true, already available. The great majority of tractors is, however, not equipped with such control means, but the necessary adjustments for obtaining correct furrow depth must be carried out manually by the tractor driver.

This invention has as its object to produce a construction which not only eliminates the aforesaid drawbacks in connection with multi-furrow plows, but also is adapted for use with single-furrow and two-furrow plows.

The invention relates, thus, to a device for the control of plows which are coupled to and drawn by tractors equipped with a three-point hitch operated by a hydraulic system, the two pull rods of the tractor being articulated at the ends of a supporting axle made of two parts adapted to rotate in relation to one another, said parts mounted movably on bearing plates secured to the plow frame, in such a manner, that the one supporting axle part is mounted concentrically in the other supporting axle part. The invention is characterized in that the second supporting axle part is provided with a radially upwardly extending mast for variable fastening of the top link thereon, said mast being formed at its upper end with an open groove or the like for enclosing a top frame rigidly connected with the plow stand and allowing rotational movements of the top frame in relation to the mast.

The device according to the invention provides a transfer of force in such a manner, that during operation the top link normally has tension applied thereto, the plow being permitted to rise and fall within limits without affecting the top link. Thus in normal operation a fraction of the pulling force required is supplied by the top link, thus eliminating the risk of unstable plowing depth.

Due to the fact, that the holder is vertically rotatable in driving direction in relation to the top frame and the plow proper, the invention provides further the advantage that possible unevennesses in the soil surface in the form of elevations or depressions do not affect the furrow depth.

A specially suitable embodiment of the device according to the invention will be described in greater detail below, reference being had to the accompanying drawing in which:

The single figure is a perspective view illustrating the cooperation of the details of the invention both with each other and with the hydraulic hitch or connection means.

A plow having part of its upper plow frame 3 shown in the figure is equipped with the device according to the invention and coupled to a tractor. The two pull rods 1 of the tractor are on their respective sides of the front portion of the plow frame 3 movably mounted at the ends of a supporting axle. The said axle comprises two parts 4, 5 adapted to rotate relative to one another, each of which is movably mounted in bearing plates 6, 7 secured to the plow frame 3. The one part 4 of the supporting axle is further concentrically mounted in a sleeve 8 welded on the other part 5 of the supporting axle where it is held in axial position by a split pin 9 positioned in the sleeve 8 and adapted to engage with a groove turned in the axle part 4.

The outer ends of the two axle parts 4, 5 are in usual manner formed for eccentric cooperation with the pulling members. The angular position of the one axle part 4 in relation to the plow frame 3 is determined via a manually operated adjusting and locking means, in such a manner, that corrections of the latter have immediate effect on the horizontal adjustment of the plow via the axle part 4. Said adjusting and locking means will be described below.

The axle part 5 and sleeve 8 carry a radially upright holder or mast 10 welded thereon, the upper end of which is provided with a number of holes 10a to allow variable fastening of the top link 2 of the tractor. Said upper end is further provided with an open slot, the limiting jaws of which enclose the upper portion of a top frame 11 associated with the plow stand, in such a manner, that the holder 10 is given a relatively large freedom of movement in relation to the top frame 11. The said freedom of movement can be adjusted according to desire by an adjusting screw 12 positioned on the holder 10.

The top frame 11 is shaped like a yoke and secured to the plow stand in that the lower ends of its legs are fastened in the bearing plates 6, 7 and braced by two struts 16 rigidly mounted in the plow frame 3.

A bracket 13 is secured to the top frame 11 and carries at its outer free end a movably supported control handle 14. The said handle cooperates with a toothed quadrant 15 secured to the bracket 13, in such a manner that, when the latch 14a is disengaged manually in known manner the control handle 14 can be turned into desired position.

The lower lever 14b of the control handle is adapted via a movably mounted link 17 to cooperate with an arm 4a secured to the supporting axle part 4, whereby rotational movements of the control handle 14 are transferred immediately to the plow via the supporting axle part 4 for adjusting the horizontal setting of the plow.

The device according to the invention operates, thus, such that upon stronger resistance by earth the top frame of the plow will abut against the front edge of the open slot in the holder. With decreasing soil resistance, the top frame disengages from the said edge and assumes an intermediate position, while during the transport of the (suspended) plow the top frame will abut against the rear edge of the open slot.

What we claim is:

1. For use with an agriculture tractor of the type having a rear-mounted hydraulic-actuated three-point implement supporting structure comprising two pull rods and one compression bar; a plow structure having a rigid frame, said frame incorporating an upstanding bail structure, a transverse shaft journalled in said frame and adapted to be connected to said pull rods by its crank-shaped ends, an upstanding mast member rigidly connected to said shaft between its ends and adapted to be connected to said compression bar at a selected one of several predetermined positions, the top end of said mast member having an upwardly facing open slot extending in the fore-and-aft direction, said slot accommodating with an amount of play the cross member of said bail structure to permit relative tilting movements between said bail structure and said column member.

2. In a plow structure as claimed in claim 1 the provision of adjusting means for varying the effective length of said slot.

No references cited.

ANTONIO F. GUIDA, *Acting Primary Examiner.*

T. GRAHAM CRAVER, *Examiner.*